United States Patent
Boesen et al.

(10) Patent No.: US 10,453,450 B2
(45) Date of Patent: Oct. 22, 2019

(54) WEARABLE EARPIECE VOICE COMMAND CONTROL SYSTEM AND METHOD

(71) Applicant: BRAGI GmbH, München (DE)

(72) Inventors: Peter Vincent Boesen, München (DE);
Johannes Caspari, München (DE);
Conor Kennedy, München (DE);
Dayana Penkova, München (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 15/290,680

(22) Filed: Oct. 11, 2016

(65) Prior Publication Data

US 2017/0110124 A1    Apr. 20, 2017

Related U.S. Application Data

(60) Provisional application No. 62/244,160, filed on Oct. 20, 2015.

(51) Int. Cl.
| | |
|---|---|
| *H04R 1/10* | (2006.01) |
| *G10L 15/22* | (2006.01) |
| *G06F 3/0488* | (2013.01) |
| *G10L 15/08* | (2006.01) |

(52) U.S. Cl.
CPC .......... *G10L 15/22* (2013.01); *G06F 3/04883* (2013.01); *G10L 15/08* (2013.01); *H04R 1/1016* (2013.01); *G10L 2015/088* (2013.01); *G10L 2015/223* (2013.01); *H04R 1/1041* (2013.01); *H04R 2420/07* (2013.01)

(58) Field of Classification Search
CPC ..................................................... G06F 3/017
See application file for complete search history.

(56) References Cited

U.S. PATENT DOCUMENTS

| | | |
|---|---|---|
| 3,934,100 A | 1/1976 | Harada |
| 4,150,262 A | 4/1979 | Ono |
| 4,334,315 A | 6/1982 | Ono et al. |
| 4,375,016 A | 2/1983 | Harada |
| 4,588,867 A | 5/1986 | Konomi |
| 4,654,883 A | 3/1987 | Iwata |

(Continued)

FOREIGN PATENT DOCUMENTS

| | | |
|---|---|---|
| EP | 1017252 A2 | 7/2000 |
| GB | 2074817 | 4/1981 |

(Continued)

OTHER PUBLICATIONS

Announcing the $3,333,333 Stretch Goal (Feb. 24, 2014).

(Continued)

*Primary Examiner* — Kile O Blair
(74) *Attorney, Agent, or Firm* — Goodhue, Coleman & Owens, P.C.

(57) ABSTRACT

An earpiece includes an earpiece housing, an intelligent control disposed within the ear piece housing, at least one audio input sensor operatively connected to the intelligent control, a transceiver operatively connected to the intelligent control, and a user interface operatively connected to the intelligent control and configured for receiving user input. The intelligent control is configured to receive voice input through the at least one audio input sensor and interpret the voice input to determine a voice command from a set of voice commands.

20 Claims, 4 Drawing Sheets

(56) References Cited

U.S. PATENT DOCUMENTS

| | | | |
|---|---|---|---|
| 4,682,180 A | 7/1987 | Gans | |
| 4,791,673 A | 12/1988 | Schreiber | |
| 4,865,044 A | 9/1989 | Wallace et al. | |
| 5,191,602 A | 3/1993 | Regen et al. | |
| 5,201,007 A | 4/1993 | Ward et al. | |
| 5,280,524 A | 1/1994 | Norris | |
| 5,295,193 A | 3/1994 | Ono | |
| 5,298,692 A | 3/1994 | Ikeda et al. | |
| 5,343,532 A | 8/1994 | Shugart | |
| 5,363,444 A | 11/1994 | Norris | |
| 5,497,339 A | 3/1996 | Bernard | |
| 5,606,621 A | 2/1997 | Reiter et al. | |
| 5,613,222 A | 3/1997 | Guenther | |
| 5,692,059 A | 11/1997 | Kruger | |
| 5,721,783 A | 2/1998 | Anderson | |
| 5,749,072 A | 5/1998 | Mazurkiewicz et al. | |
| 5,771,438 A | 6/1998 | Palermo et al. | |
| 5,802,167 A | 9/1998 | Hong | |
| 5,929,774 A | 7/1999 | Charlton | |
| 5,933,506 A | 8/1999 | Aoki et al. | |
| 5,949,896 A | 9/1999 | Nageno et al. | |
| 5,987,146 A | 11/1999 | Pluvinage et al. | |
| 6,021,207 A | 2/2000 | Puthuff et al. | |
| 6,054,989 A | 4/2000 | Robertson et al. | |
| 6,081,724 A | 6/2000 | Wilson | |
| 6,094,492 A | 7/2000 | Boesen | |
| 6,111,569 A | 8/2000 | Brusky et al. | |
| 6,112,103 A | 8/2000 | Puthuff | |
| 6,157,727 A | 12/2000 | Rueda | |
| 6,167,039 A | 12/2000 | Karlsson et al. | |
| 6,181,801 B1 | 1/2001 | Puthuff et al. | |
| 6,208,372 B1 | 3/2001 | Barraclough | |
| 6,275,789 B1 | 8/2001 | Moser et al. | |
| 6,339,754 B1 | 1/2002 | Flanagan et al. | |
| 6,408,081 B1 | 6/2002 | Boesen | |
| D464,039 S | 10/2002 | Boesen | |
| 6,470,893 B1 | 10/2002 | Boesen | |
| D468,299 S | 1/2003 | Boesen | |
| D468,300 S | 1/2003 | Boesen | |
| 6,542,721 B2 | 4/2003 | Boesen | |
| 6,549,633 B1* | 4/2003 | Westermann | H04R 25/453 381/312 |
| 6,560,468 B1 | 5/2003 | Boesen | |
| 6,654,721 B2 | 11/2003 | Handelman | |
| 6,664,713 B2 | 12/2003 | Boesen | |
| 6,694,180 B1 | 2/2004 | Boesen | |
| 6,718,043 B1 | 4/2004 | Boesen | |
| 6,738,485 B1 | 5/2004 | Boesen | |
| 6,748,095 B1 | 6/2004 | Goss | |
| 6,754,358 B1 | 6/2004 | Boesen et al. | |
| 6,784,873 B1 | 8/2004 | Boesen et al. | |
| 6,823,195 B1 | 11/2004 | Boesen | |
| 6,852,084 B1 | 2/2005 | Boesen | |
| 6,879,698 B2 | 4/2005 | Boesen | |
| 6,892,082 B2 | 5/2005 | Boesen | |
| 6,920,229 B2 | 7/2005 | Boesen | |
| 6,952,483 B2 | 10/2005 | Boesen et al. | |
| 6,987,986 B2 | 1/2006 | Boesen | |
| 7,136,282 B1 | 11/2006 | Rebeske | |
| 7,203,331 B2 | 4/2007 | Boesen | |
| 7,209,569 B2 | 4/2007 | Boesen | |
| 7,215,790 B2 | 5/2007 | Boesen et al. | |
| 7,463,902 B2 | 12/2008 | Boesen | |
| 7,508,411 B2 | 3/2009 | Boesen | |
| 7,983,628 B2 | 7/2011 | Boesen | |
| 8,140,357 B1 | 3/2012 | Boesen | |
| 9,806,795 B2* | 10/2017 | Chen | H04B 7/26 |
| 9,875,753 B2* | 1/2018 | Ungstrup | H04R 25/55 |
| 2001/0005197 A1 | 6/2001 | Mishra et al. | |
| 2001/0027121 A1 | 10/2001 | Boesen | |
| 2001/0056350 A1 | 12/2001 | Calderone et al. | |
| 2002/0002413 A1 | 1/2002 | Tokue | |
| 2002/0007510 A1 | 1/2002 | Mann | |
| 2002/0010590 A1 | 1/2002 | Lee | |
| 2002/0030637 A1 | 3/2002 | Mann | |
| 2002/0046035 A1 | 4/2002 | Kitahara et al. | |
| 2002/0057810 A1 | 5/2002 | Boesen | |
| 2002/0076073 A1 | 6/2002 | Taenzer et al. | |
| 2002/0118852 A1 | 8/2002 | Boesen | |
| 2003/0065504 A1 | 4/2003 | Kraemer et al. | |
| 2003/0100331 A1 | 5/2003 | Dress et al. | |
| 2003/0104806 A1 | 6/2003 | Ruef et al. | |
| 2003/0115068 A1 | 6/2003 | Boesen | |
| 2003/0122652 A1* | 7/2003 | Himmelstein | B60R 25/257 340/5.81 |
| 2003/0125096 A1 | 7/2003 | Boesen | |
| 2003/0218064 A1 | 11/2003 | Conner et al. | |
| 2004/0070564 A1 | 4/2004 | Dawson et al. | |
| 2004/0160511 A1 | 8/2004 | Boesen | |
| 2005/0043056 A1 | 2/2005 | Boesen | |
| 2005/0125320 A1 | 6/2005 | Boesen | |
| 2005/0148883 A1 | 7/2005 | Boesen | |
| 2005/0165663 A1 | 7/2005 | Razumov | |
| 2005/0196009 A1 | 9/2005 | Boesen | |
| 2005/0251455 A1 | 11/2005 | Boesen | |
| 2005/0266876 A1 | 12/2005 | Boesen | |
| 2006/0029246 A1 | 2/2006 | Boesen | |
| 2006/0074671 A1 | 4/2006 | Farmaner et al. | |
| 2006/0074808 A1 | 4/2006 | Boesen | |
| 2007/0230736 A1 | 10/2007 | Boesen | |
| 2008/0046250 A1* | 2/2008 | Agapi | G10L 15/075 704/275 |
| 2008/0254780 A1 | 10/2008 | Kuhl et al. | |
| 2010/0245585 A1* | 9/2010 | Fisher | H04M 1/6066 348/164 |
| 2010/0257234 A1* | 10/2010 | Caughey | H04L 67/306 709/203 |
| 2013/0343584 A1 | 12/2013 | Bennett et al. | |
| 2014/0003635 A1* | 1/2014 | Mohammad | G10K 11/16 381/306 |
| 2015/0230019 A1 | 8/2015 | Sakai et al. | |

FOREIGN PATENT DOCUMENTS

| | | |
|---|---|---|
| GB | 2367399 | 3/2002 |
| WO | 2010019634 A2 | 2/2010 |
| WO | 2014043179 A3 | 7/2014 |
| WO | 2015110577 A1 | 7/2015 |
| WO | 2015110587 A1 | 7/2015 |

OTHER PUBLICATIONS

BRAGI is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update—Memories From Apr.—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).

(56) References Cited

OTHER PUBLICATIONS

BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, On Track(May 16, 2015).
BRAGI Update—Beta2 Production and Factory Line(Aug. 20, 2015).
BRAGI Update—Certifications, Production, Ramping Up (Nov. 13, 2015).
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—On Track, Design Verification, How It Works and What's Next(Jul. 15, 2015).
BRAGI Update—On Track, on Track and Gems Overview (Jun. 24, 2015).
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Last Push Before the Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & the BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
International Search Report & Written Opinion, PCT/EP16/75125 (dated Feb. 13, 2017).
BRAGI Update—Getting Close(Aug. 6, 2015).

* cited by examiner

WEARABLE EARPIECE VOICE COMMAND CONTROL SYSTEM AND METHOD

PRIORITY STATEMENT

This application claims priority to U.S. Provisional Patent Application 62/244,160, filed on Oct. 20, 2015, and entitled Wearable Earpiece Voice Command Control System and Method, hereby incorporated by reference in its entirety.

FIELD OF THE INVENTION

The present invention relates to wearable devices. More particularly, but not exclusively, the present invention relates to ear pieces.

BACKGROUND

Wearable devices, including earpieces may have multiple use case advantages. For example, the user can listen to music, track various biometric parameters, as well as communicate with others via Bluetooth or other short range communications. Earpieces may be controlled in various ways including through manual controls of various types. However, if manual controls of any type are used, issues remain as there are times where the user is neither free to use such gesture based commands nor contact the touch sensitive segments of the device. What is needed are customized voice commands that are responsive to the user, able to be activated or inactivated and are able to be used to supplement the other forms of interaction with the user.

Therefore, what is needed is an improved wearable device such as an earpiece which provides for receiving and processing voice commands.

SUMMARY

Therefore, it is a primary object, feature or advantage of the present invention to improve over the state of the art.

It is a further object, feature, or advantage of the present invention to provide a wearable device that may receive and interpret voice commands.

It is a still further object, feature, or advantage of the present invention to provide a wearable device which may be controlled through multiple user interfaces including a gesture-based user interface and a voice interface.

Another object, feature, or advantage is to control a variety of functions of an earpiece using voice commands.

Yet another object, feature, or advantage is to provide for access to various device functions while remaining completely hands-free.

A still further object, feature, or advantage is to allow for access to functions when accelerometer or gyrometer functions are detecting significant movement such as when performing heavy physical activities.

Another object, feature, or advantage is to allow for control of various levels of voice control.

Yet another object, feature, or advantage is to allow for extended levels of voice control to new apps and functions via updates or otherwise.

A further object, feature, or advantage is to allow for a user to choose to activate or deactivate voice controls.

A still further object, feature, or advantage is to allow for a user to use voice controls from a wearable device such as an earpiece to link to voice assistants to further extend the range of earpiece voice control capabilities.

Another object, feature, or advantage is to allow for advanced learning via voice interaction pattern analysis allowing for voice unlocking of various functions.

Yet another object, feature, or advantage is to allow for keyword bands free activation.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect an earpiece includes an earpiece housing, an intelligent control disposed within the ear piece housing, at least one audio input sensor operatively connected to the intelligent control, a transceiver operatively connected to the intelligent control, and a user interface operatively connected to the intelligent control and configured for receiving user input. The intelligent control is configured to receive voice input through the at least one audio input sensor and interpret the voice input to determine a voice command from a set of voice commands.

According to another aspect, a method for voice control is provided. The method includes providing an earpiece comprising an earpiece housing, an intelligent control disposed within the ear piece housing, at least one audio input sensor operatively connected to the intelligent control, a transceiver operatively connected to the intelligent control, and a user interface operatively connected to the intelligent control and configured for receiving user input. The method further includes receiving voice input through the at least one audio input sensor, interpreting the voice input to determine a voice command from a set of voice commands, and executing the voice command to control the earpiece or a device in operative communication with the earpiece.

According to another aspect, a method for voice control includes providing an earpiece comprising an earpiece housing, an intelligent control disposed within the ear piece housing, at least one audio input sensor operatively connected to the intelligent control, a transceiver operatively connected to the intelligent control, and a user interface operatively connected to the intelligent control and configured for receiving user input, and wherein the earpiece is configured to perform voice assistant functions. The method further includes receiving voice input through the at least one audio input sensor, interpreting the voice input to determine a voice command from a first set of voice commands, wherein the first set of voice commands is associated with the earpiece. If the voice command is not within the first set of voice commands, the method provides for communicating the voice input to an electronic device in operative communication with the earpiece wherein the electronic device is configured tor voice control. The electronic device may include a voice assistant.

DETAILED DESCRIPTION

The present invention provides for a new and improved wearable device and related methods and systems. Although various types of wearable devices are contemplated, one type of wearable device of particular interest is the ear piece or a set of earpieces which includes two ear pieces, a left ear piece and a right ear piece. The device(s) provide for voice control over functionality of the device itself and linked devices, systems, and/or services.

Figure 1:
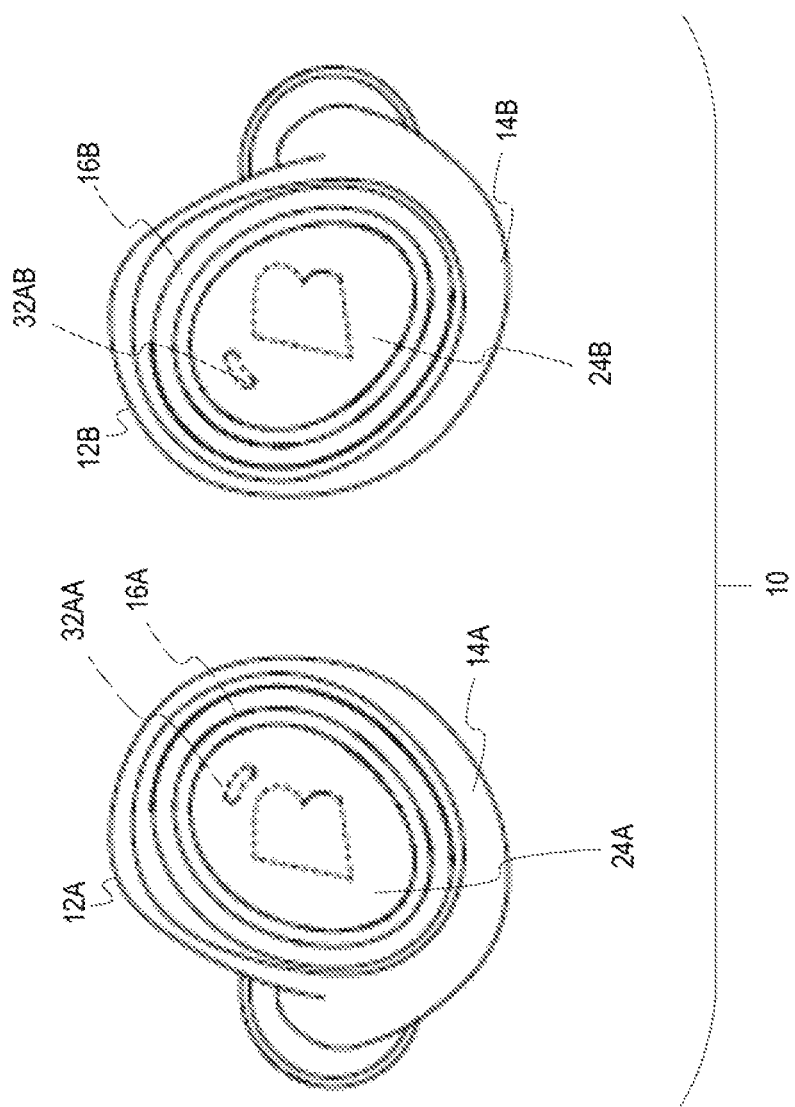
FIG. 1 illustrates a set of ear pieces which are enabled to provide for voice control.

FIG. 1 illustrates one example of a wearable device in the form of a set of earpieces 10 including a left ear piece 12A and a right earpiece 12B. Each of the ear pieces 12A, 12B has an ear piece housing 14A, 14B which may be in the form of a protective shell or casing. A light display area 16A, 16B is present on each of the ear pieces 12A, 12B. The light display areas 16A, 16B each provide for producing light of one or more colors. The left ear piece 12A has a microphone 32AA and the right ear piece 12B has a microphone 32AB.

Figure 2:
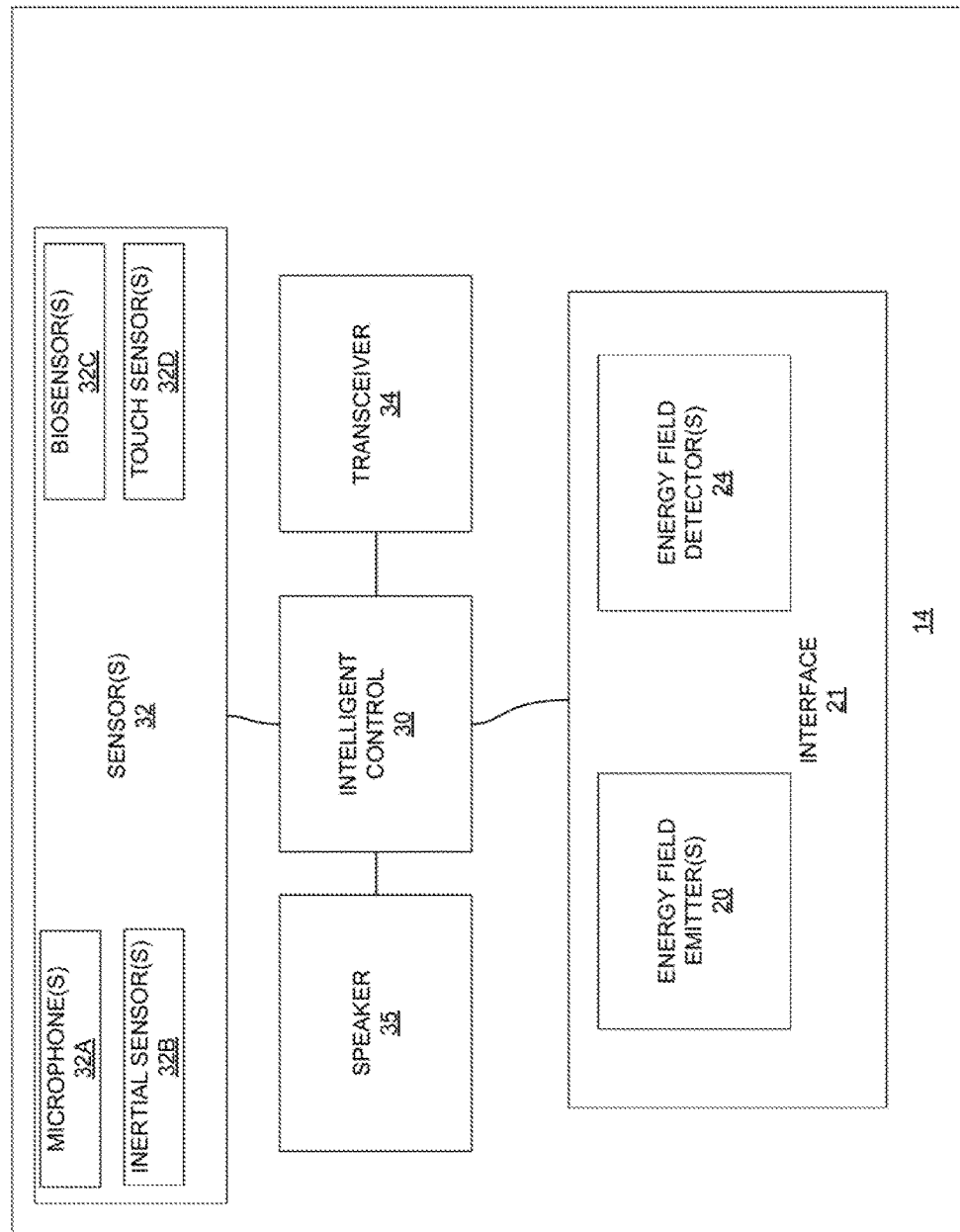
FIG. 2 is a block diagram of one example of an ear piece.

FIG. 2 is a block diagram illustrating a device with a housing 14. The device may include a gesture based user interface 21 including one or more energy field emitters and one or more energy field detectors. One or more energy field emitters 20 (such as ER LEDs, other type of light emitters, ultrasound emitters, or other types of sound emitters, or other energy field emitters) may be used. The energy field emitters are operatively connected to the intelligent control 30. It should be understood that interconnecting logic and circuits are not shown. It is to be further understood that the intelligent control shown may include a plurality of different processors or additional circuitry. The intelligent control 30 may also be operatively connected to one or more energy field detectors 24. The energy field detectors may be light detectors, sound detectors or other types of detectors or receivers. For example, wherein the energy field emitters 20 are IR LEDs, the energy field detectors 24 may be IR receivers. The intelligent control 30 may also be electrically connected to one or more sensors 32 and a transceiver 34 such as a short range transceiver using Bluetooth, UWB, magnetic induction, or other means of communication. The intelligent control 30 may also be operatively connected to one or more speakers 35. In operation, the intelligent control 30 may be programmed to receive different information using a gesture based user interface including the energy field emitter(s) 20 and the energy field detector(s) 24 based on context or mode of operation of the device. Alternatively, instead of or in addition to a gesture based interface, a user interface may include one or more touch sensors 32D or other manual inputs. Thus, the ear piece device may have one or more user interfaces in addition to the voice interface.

Where the device is an earpiece, the sensor(s) may include an inertial sensor 32B, one or more microphones 32A, one or more biosensors 32C, one or more touch sensors 32D or other manual inputs. The one or more microphones 32A may allow for air conduction or bone conduction to pickup or capture the voice of the person wearing the device. Where multiple microphones 32A are present the earpiece or two earpieces working together may perform processing on voice signals from the multiple microphones 32A in order to provide an improved quality voice signal to use for voice commands.

Figure 3:
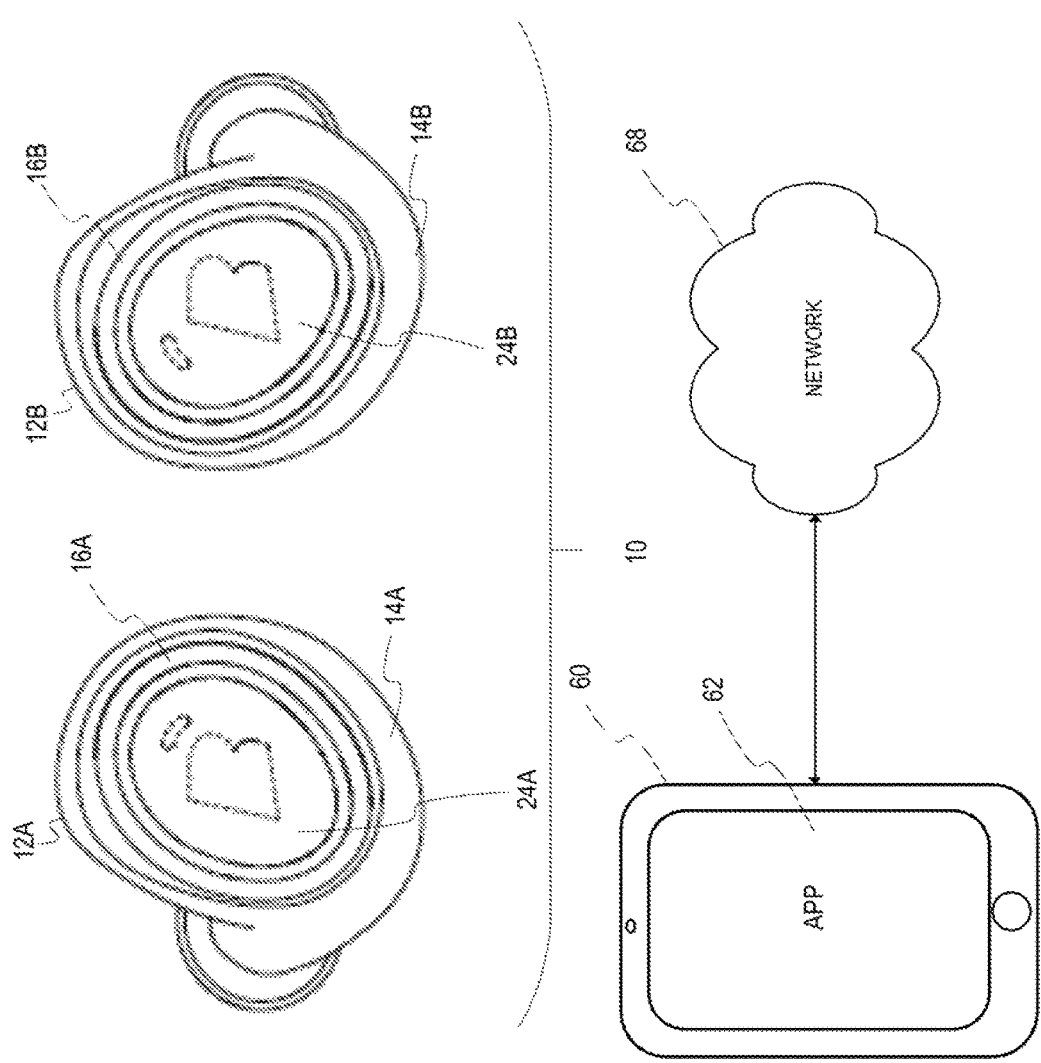
FIG. 3 illustrates one or more earpieces in communication with a mobile app executing on a mobile device.

FIG. 3 illustrates a set of earpieces 10 in operative communication with a software application such as a mobile app executing on a computing device such as a mobile device 60. The mobile device 60 may also be in communication with a network 68 such as the Internet. Although a mobile device is shown, it is to be understood that any number of computing devices may be used which provide a transceiver to communicate with one or more of the earpieces. Thus, for example, the computing device may be incorporated into an entertainment device such as a television, a vehicle, or any number of other types of devices. The mobile app may be configured to assist in setting up parameters associated with voice control. For example, the mobile app may show the user the preset commands or otherwise assist the user in learning the preset commands. The mobile app may be used to assist the user in defining new commands or new functions. In addition, the mobile app may be used so that a user may select whether they seek to control the set of earpieces 10 exclusively via voice command or want to control the set of earpieces 10 in combination with one or more other user interfaces such as a gesture based user interface and/or a manual user interface including one or more manual inputs. In addition, the user may select to activate or deactivate voice controls. For example, a mountain bike rider might elect to utilize full voice control over the earpiece devices, due to the frequency of changes in angular acceleration while operating their bike. Such changes could potentially be misinterpreted; choosing this alternative methodology for interaction would alleviate such concerns. Additionally, this would allow the user to maintain both hands on the bicycle's controls. Consequently, this would allow the user to avoid potentially disastrous spills and injuries. Thus, there are numerous situations where it may be advantageous to provide voice control over other methodologies. However, it is contemplated that a user may select when they want to use voice control alone, when they want to use one or more alternative modalities, or when they may want to use both.

It should also be apparent that the mobile device 60 or other computing device may have an associated voice command system present. For example, Siri, Cortana, Google Now and Alexa smart assistants may be accessed via the voice commands, allowing still additional hands-free and gesture free functionality. The native control functions may reside on the earpiece, or alternately on the connected device through a Bluetooth or other short range linkage system. Additionally, over time the voice control may learn the nuances of a user's specific voice so that hands free access to specific or hidden settings can be facilitated through onboard voice analysis. Further additional capabilities can be achieved through customization of the activation commands, such as "Hello Bragi", "Hey Bragi" or other commands.

In addition, according to user preferences or otherwise, information associated with a user that may be used to assist in making recommendations or predicting commands may be stored and appropriate algorithms may be employed to assist in improving, the user's experience. The voice assistant may be a voice-activated intelligent assistant. It is noted that where the voice assistant is a part of the earpiece, a user may developer a closer more personal relationship with the voice assistant than what has been known in the past. Appropriate artificial intelligence may be used to emulate or give the impression of a presence contained within the earpiece so that a user feels as if they are talking to someone (e.g. a "her") as opposed to something.

Figure 4:
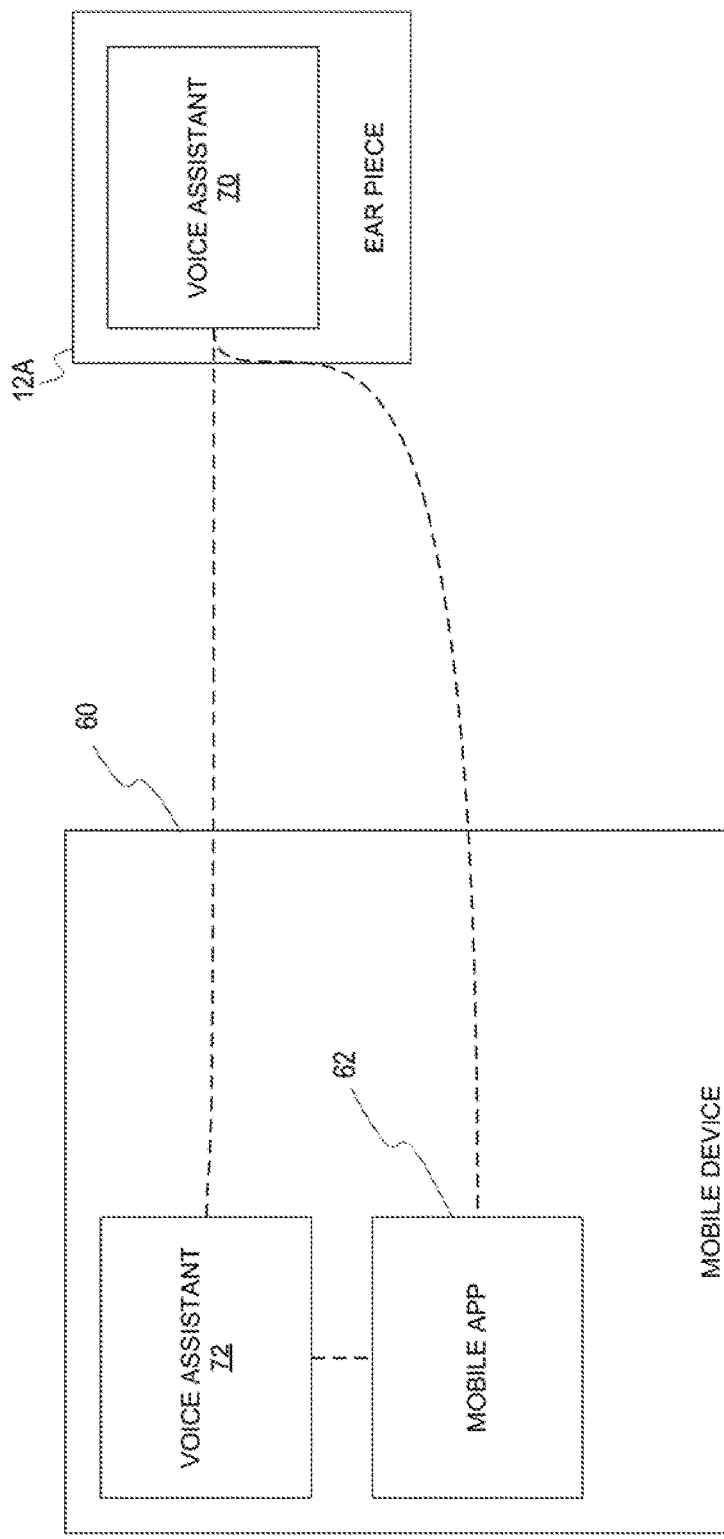
FIG. 4 illustrates an example of an earpiece with a voice assistant which may be in operative communication with a voice assistant associated with a mobile device.

FIG. 4 illustrates an example of an earpiece with a voice assistant which may be in operative communication with a voice assistant associated with a mobile device. The earpiece 12A may have a voice assistant 70 which may be implemented as a set of instructions stored on a memory within the earpiece 12A. The voice assistant 12A may be in operative communication with a voice assistant 72 associated with a mobile device 60 either directly or through a mobile app 62 stored and executed on the mobile device 60. In one example, native voice commands may be made using the earpiece 12A which interact with the voice assistant 72 of the mobile device 60. Thus, a first set of commands or a first set of functions may be performed by the earpiece using the voice assistant 70. These may involve control of the earpiece 12A or other types of functions or commands. Alternatively, they may involve control of functions associated with or performed by the mobile device 60. As second set of commands or a second set of functions may be performed by conveying commands to the voice assistant 72. These commands or functions may relate to controlling of the mobile device 60 or its functionality. It is to be appreciated that interaction between the voice assistant 70 and the voice assistant 72 may allow for the earpiece 12A to be able to expand its control and commands available to it. Either voice assistant may be used to interpret direct commands regarding device operations, answer questions, receive requests, make personalized recommendations, activate appropriate features of the device or other devices in communication therewith or otherwise provide voice assistant functionality.

The mobile device may include an operating system executing thereon and its operating system may include the voice assistant or intelligent assistant or else the voice assistant or intelligent assistant may be an application or service otherwise executing on the mobile device. Different examples may include the Sin voice assistant operating on iOS, the Google Now voice assistant operating on Android, and Cortana operating on Microsoft Windows Phone. Similarly, examples of intelligent assistants associated with apps may include Alexa from Amazon and M from Facebook.

Although as shown in FIG. 4, the ear piece 12A communicates with a mobile device 60, it is to be understood that the earpiece 12A may communicate with other types of computing devices including other types of devices which have a voice assistant such as desktop computers, vehicles, televisions, or any number of other type of electronic devices. It is to be further understood that any number of voice related functions may be perfumed. This may include voice control, dictation, and voice authentication such as voice print analysis or other security features.

Therefore, various methods and systems have been shown and described herein. The present invention is not to be limited to the specific embodiments described herein as numerous variations, options, and alternatives are contemplated including variations in the type of device, the sensors used in the device, the types of other devices which interact, the functionalities provided and other variations.

What is claimed is:

1. A set of earpieces, comprising:
    a left earpiece housing and a right earpiece housing;
    an intelligent control disposed within the left earpiece housing and the right earpiece housing;
    a plurality of sensors including at least one audio input sensor operatively connected to the intelligent control within the left and the right earpieces, touch sensors, inertial sensors, and biometric sensors within the left and right earpieces;
    a transceiver operatively connected to the intelligent control;
    a user interface operatively connected to the intelligent control and configured for receiving user input;
    wherein the left earpiece is in operative communication with the right earpiece;
    wherein the intelligent control of the left and right earpieces is configured to receive voice input through the at least one audio input sensor of the left and right earpieces and work together to provide an improved quality voice signal to determine a voice command from a set of voice commands;
    wherein the set of earpieces is configured to communicate through the transceiver with a computing device configured to use a voice assistant and wherein the voice commands include voice commands associated with the voice assistant for controlling the computing device;
    wherein the set of earpieces include an audio command only mode, a touch and gesture mode, and a combined mode for audio commands and touch and gesture commands; and
    wherein the set of voice commands include a plurality of voice commands for executing on the computing device to control the computing device.

2. The earpiece of claim 1 wherein the intelligent control is further configured to convey the voice command from the set of earpieces to another device through the transceiver of the set of earpieces.

3. The earpiece of claim 1 wherein the user interface is a gesture-based interface detecting gestures utilizing energy field emitters and detectors.

4. The earpiece of claim 1 wherein the user interface comprises one or more manual inputs.

5. The earpiece of claim 1 wherein the audio command only mode is activated utilizing an activation command.

6. The earpiece of claim 1 wherein the set of earpieces is configured to communicate through the transceiver with a computing device executing a software application for changing settings associated with the set of earpieces.

7. The earpiece of claim 6 wherein the settings include a setting for activating or deactivating modes of the set of earpieces utilizing voice commands, gestures, and manual input.

8. The earpiece of claim 1 wherein the at least one audio input sensor is a bone conduction microphone.

9. The earpiece of claim 1 wherein the voice assistant is configured to emulate a presence.

10. The earpiece of claim 1 wherein the voice assistant is configured to analyze the nuances of a user's voice for accessing settings associated with the computing device.

11. A method for voice control of a set of earpieces each comprising:
    an earpiece housing,
        an intelligent control disposed within the earpiece housing,
        a plurality of sensors including at least one audio input sensor operatively connected to the intelligent control, touch sensors, inertial sensors, and biometric sensors,
        a transceiver operatively connected to the intelligent control, and
        a user interface operatively connected to the intelligent control and configured for receiving user input;
    the method comprising:
        communicating between the set of earpieces;
        receiving a selection of a mode, wherein the set of earpieces include an audio commands only mode, a touch and gesture mode, and a combined mode for audio commands and touch and gesture commands;
        implementing the mode in response to the selection;
        receiving voice input through the at least one audio input sensor;

processing the voice input from the at least one audio input sensor of each of the set of earpieces to provide an improved quality voice input;
interpreting the improved quality voice input using a voice assistant to determine a voice command from a set of voice commands; and
determining if the voice command is to be performed by the set of earpieces or communicated to a linked device;
executing the voice command to control the earpiece if the voice command is to be performed by the set of earpieces; and
communicating the voice command to a voice assistant onboard the linked device if the voice command is to be performed by the linked device in operative communication with the set of earpieces;
wherein the voice command is associated with device operations, personalized recommendations, or device features.

12. The method of claim 11 wherein the interpreting the voice input is performed by the intelligent control within the earpiece housing.

13. The method of claim 11 wherein the linked device in operative communication with the set of earpieces is a wearable device or a mobile device.

14. The method of claim 11 wherein gesture commands are received utilizing energy field emitters and detectors, and wherein the at least one audio input sensor is a bone conduction microphone.

15. The method of claim 11 wherein the voice assistant is configured to emulate a presence.

16. A method for voice control of a set of earpieces, each earpiece comprising:
an earpiece housing,
an intelligent control disposed within the earpiece housing,
a plurality of sensors including at least one audio input sensor operatively connected to the intelligent control,
a transceiver operatively connected to the intelligent control, touch sensors, inertial sensors, and biometric sensors, and
a user interface operatively connected to the intelligent control and configured for receiving user input, and wherein the set of earpieces are configured to perform voice assistant functions;
the method comprising:
communicating between the set of earpieces;
receiving a selection of a mode, wherein the set of earpieces include an audio commands only mode, a touch and gesture mode, and a combined mode for audio commands and touch and gesture commands;
implementing the mode in response to the selection;
receiving voice input through the at least one audio input sensor;
processing the voice input from the at least one audio input sensor of each of the set of earpieces to provide an improved quality voice input;
interpreting the improved quality voice input to determine a voice command from a first set of voice commands, wherein the first set of voice commands is associated with the set of earpieces;
communicating the voice input directly to a voice assistant app of a mobile device in operative communication with the set of earpieces if the voice input is not within the first set of voice commands, wherein the voice assistant app of the mobile device is configured to perform an action on the mobile device based on the voice input.

17. The method of claim 16 wherein the voice assistant app is integrated into an operating system of the mobile device.

18. The method of claim 17 further comprising providing, via the voice assistant app, a recommendation using information associated with a user.

19. The method of claim 17 further comprising assisting a user in defining new commands for the audio commands, touch commands, and gesture commands.

20. The method of claim 16, wherein gesture commands are received utilizing energy field emitters and detectors, and wherein the at least one audio input sensor is a bone conduction microphone.

* * * * *